US012661739B2

(12) United States Patent
Hosseini

(10) Patent No.: US 12,661,739 B2
(45) Date of Patent: Jun. 23, 2026

(54) MATERIAL PROCESSING BY TURBO BURST ULTRAFAST LASER PULSE

(71) Applicant: Applied Materials, Inc., Santa Clara, CA (US)

(72) Inventor: S. Abbas Hosseini, Los Altos, CA (US)

(73) Assignee: Applied Materials, Inc., Santa Clara, CA (US)

(*) Notice: Subject to any disclaimer, the term of this patent is extended or adjusted under 35 U.S.C. 154(b) by 1055 days.

(21) Appl. No.: 17/744,494

(22) Filed: May 13, 2022

(65) Prior Publication Data

US 2022/0362881 A1    Nov. 17, 2022

Related U.S. Application Data

(60) Provisional application No. 63/188,327, filed on May 13, 2021.

(51) Int. Cl.
| | |
|---|---|
| *B23K 26/0622* | (2014.01) |
| *B23K 26/064* | (2014.01) |
| *B23K 26/364* | (2014.01) |
| *B23K 103/00* | (2006.01) |

(52) U.S. Cl.
CPC ...... *B23K 26/0624* (2015.10); *B23K 26/0648* (2013.01); *B23K 26/364* (2015.10); *B23K 2103/54* (2018.08)

(58) Field of Classification Search
CPC ............ B23K 26/0624; B23K 26/0648; B23K 26/364; B23K 2103/54; C03B 33/0222
USPC ................................................... 219/121.69
See application file for complete search history.

(56) References Cited

U.S. PATENT DOCUMENTS

| | | |
|---|---|---|
| 2015/0151380 A1 | 6/2015 | Hosseini |
| 2015/0166394 A1 | 6/2015 | Marjanovic et al. |
| 2015/0166397 A1* | 6/2015 | Marjanovic ........ B23K 26/0624 |
| | | 65/112 |
| 2017/0129054 A1 | 5/2017 | Dittli |
| 2019/0062196 A1 | 2/2019 | Bui |
| 2019/0300418 A1* | 10/2019 | Rosier .................... B23K 26/53 |
| 2020/0343682 A1* | 10/2020 | Honninger ............ H01S 3/0085 |

FOREIGN PATENT DOCUMENTS

| | | |
|---|---|---|
| FR | 3092266 A1 | 7/2020 |

OTHER PUBLICATIONS

"Carbide Unibody-Design Industrial-Grade Femtosecond Lasers", "BiBurst option", Product data sheet, Light Conversion, Lithuania, Apr. 21, 2021.

(Continued)

*Primary Examiner* — Topaz L. Elliott
*Assistant Examiner* — Daniel Ward Hatten
(74) *Attorney, Agent, or Firm* — Patterson + Sheridan, LLP

(57) ABSTRACT

A method for scribing transparent material with a laser is provided. The method includes providing relative movement between the laser and the transparent material, pulsing the laser at a first pulse repetition rate in a kHz range to establish a speed of scribing of the transparent material, and forming each of said first laser pulses with a series of second laser pulses having a second pulse repetition rate in a MHz range, wherein each of said second lasers pulses is formed from a series of third laser pulses having a third pulse repetition rate in a GHz range.

18 Claims, 9 Drawing Sheets

(56)     References Cited

OTHER PUBLICATIONS

Japanese Office Action issued to patent application No. 2023-570242 on Jan. 28, 2025.
European Search Report issued to patent application No. 22808455.4 n Mar. 5, 2025.
International Search Report/ Written Opinion issued to PCT/US2022/029299 on Jan. 12, 2023.
Japanese Office Action dated Jul. 15, 2025 for Application No. 2023-570242, 10 pages.
Ultrafast Lasers for Industry. Product Catalog. Light Conversion. 2020.
Korean Office Action issued to patent application No. 10-2023-7042813 on Sep. 25, 2025.

* cited by examiner

- Surface Profile
  - Sa Measurement
  - 680 nm

- Surface Profile
  - Sa Measurement
  - ~ 140 nm!

MATERIAL PROCESSING BY TURBO BURST ULTRAFAST LASER PULSE

CROSS-REFERENCE TO RELATED APPLICATIONS

This application claims the benefit of U.S. Patent Provisional Application No. 63/188,327, filed May 13, 2021. All subject matter set forth in Provisional Application No. 63/188,327 is hereby incorporated by reference into the present application as if fully set forth herein.

FIELD

Embodiments of the present disclosure generally relate to the laser scribing industry. More specifically, embodiments described herein provide a system and methods for scribing transparent material with a GHz and MHz burst combined with a short duration laser pulse.

BACKGROUND

Glass is a very strategic material since the formation of modern civilization. From architectural to automotive and aerospace, from microelectronics to semiconductor, glass is an important player across many industries. Glass continues to be a vital material for many applications, but it requires precise laser scribing to be successful.

Laser scribing of glass has remained a cha!.1enge for decades. Generally, previous approaches tried to make the sharpest possible V shape surface ablation to cut a piece of glass. Such methods were slow and tended to result in high kerf width and crack formation along the ablation line. Another later developed method employed a CO2 laser heating setup followed by a cooling nozzle. This method produced cuts with little to no debris and was excellent for straight cuts, but it was not suitable to cut curved lines.

Yet another method referred to as Stealth Dicing tightly focuses laser pulses to create an optical breakdown inside the bulk of the glass material. This creates voids causing permanent damage inside the glass sample. To cut thicker material such as glass, one needs to do multiple scans to create multiple layers of internal damages. However, due to the volume of plasma required for the optical breakdown inside the glass material, the resulting surface roughness is not appealing to the industry. Accordingly, improved systems and methods for laser scribing of glass are needed in the art.

SUMMARY

In some embodiments, a method for scribing transparent material with a laser is provided. The method includes providing relative movement between the laser and the transparent material. A first set of laser pulses is pulsed at a first pulse repetition rate in a kHz range to establish a speed of scribing of the transparent material. Each of said first laser pulses is formed with a series of second laser pulses having a second pulse repetition rate in a MHz range. Each of said second lasers pulses is formed from a series of third laser pulses having a third pulse repetition rate in a GHz range.

In some embodiments, a method for scribing transparent material with a laser is provided. The method includes providing relative movement between the laser and the transparent material, and pulsing the laser at an ultrafast pulse rate in a GHz range with a picosecond spacing between pulses.

In some embodiments, a method for scribing transparent material with a laser is provided. The method includes providing relative movement between the laser and the transparent material, and pulsing the laser at an ultrafast pulse rate in a GHz range with a picosecond spacing between pulses for enabling a pulse burst in a subsequent burst to annihilate a prior pulse burst in the transparent material and create free electrons through ionization.

In some embodiments, a system for scribing transparent material is provided. The system includes an ultrafast laser and a lens tube positioned across the transparent material, wherein the ultrafast laser is pulsed to form a focusing region on the transparent material based on optical breakdown in air.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
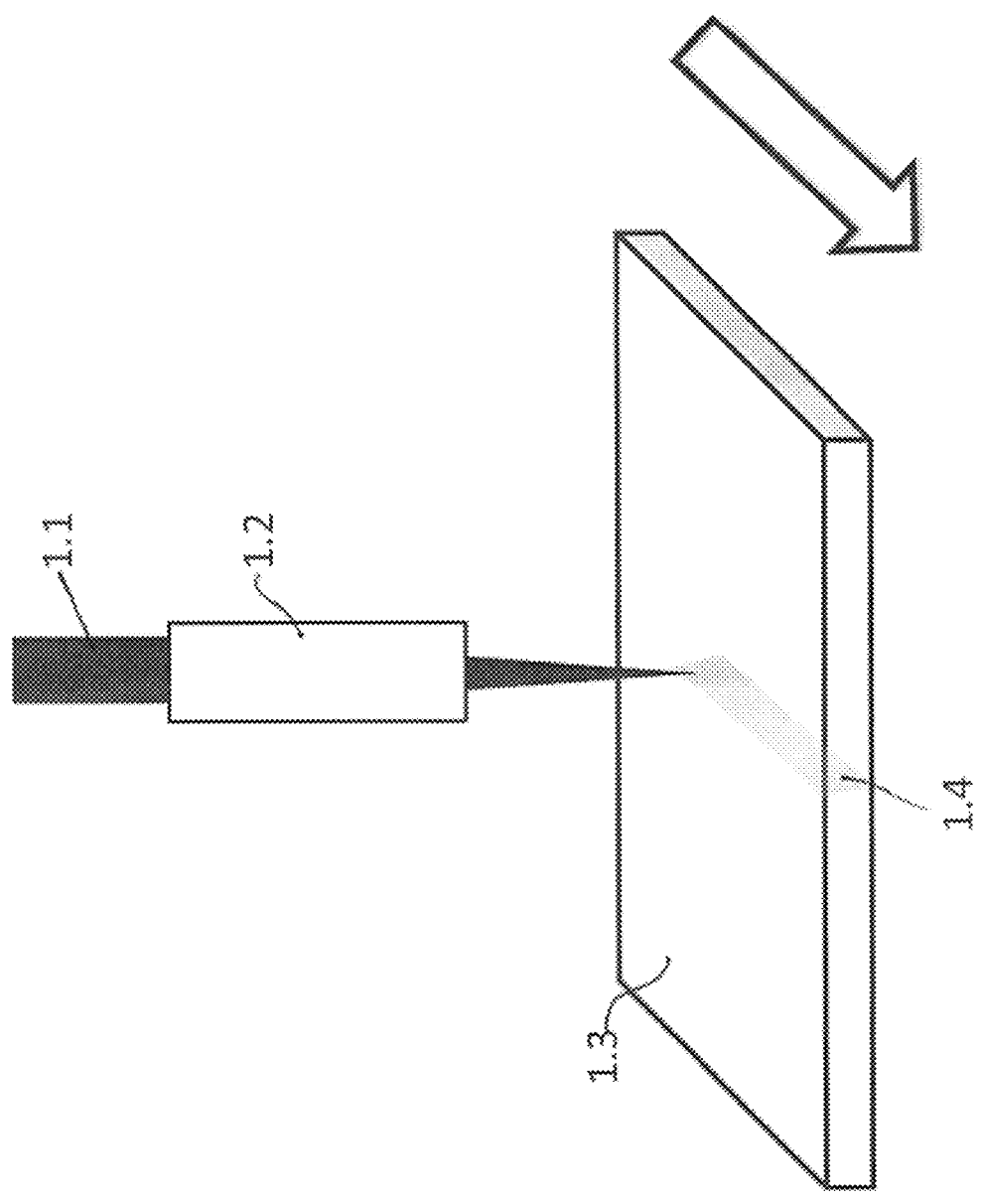
FIG. 1 is a schematic design of a laser scribing system, according to some embodiments.

Embodiments described herein provide a system and methods for scribing transparent material with a GHz and MHz burst combined with a short duration laser pulse. One embodiment of the system includes an ultrafast laser and a lens tube positioned across a transparent material, wherein the ultrafast laser is pulsed to form a focusing region on the transparent material based on optical breakdown in air. In one exemplary embodiment, the laser is focused in a location that is matched with an exit surface of the transparent material.

An ultrafast laser, as generally described herein, is a laser capable of generating ultrashort pulses with picosecond duration. Optical breakdown, as generally described herein, is a photoionization process whereby the laser intensity reaches a level above the ionization threshold. This phenomena occurs when the ultrafast laser focuses in the transparent material and creates plasma by photoionization. In some embodiments, if the density of free electrons in the photoionization process passes a critical clamp intensity value, the laser pulse energy is well absorbed by the transparent material and the volume of the created plasma starts to increase with increasing pulse energy. In various examples, the clamp intensity value is about $10^{20}$ W/cm$^3$.

In some embodiments, the lens tube includes an optical combination that may include a combination of lenses, a diffractive optical combination, or an axicon optical element. A first set of laser pulses is pulsed at a first repetition rate in a kHz range to establish a speed of scribing of the transparent material. Each of said first laser pulses is formed with a series of second laser pulses having a second pulse repetition rate in a MHz range. Each of said second laser pulses is formed from a series of third laser pulses having a third pulse repetition rate in a GHz range.

In some embodiments, the first laser repetition rate is between 1 kHz and 100 kHz. The second pulse repetition rate is between 30 MHz to 80 MHz. The spacing between the second laser pulses is in the picoseconds range.

Generally, in intense laser pulse interactions, there are two well-defined regimes: laser filamentation and optical breakdown. Optical breakdown is the result of a tightly focused laser beam inside a transparent medium that forms a localized dense plasma around the geometrical focus. The plasma generation mechanism is based on an initial multi-photon excitation of electrons followed by inverse Bremsstrahlung, impact ionization, and electron avalanche processes. Such processes underscore the refractive index and void formation processes, and form the basis of most short-pulse laser applications for material processing such as ablation. In the optical breakdown regime using traditional laser pulses, the singulation, dicing, scribing, cleaving, cutting, and facet treatment of transparent materials have disadvantages such as slow processing speed, generation of cracks and contamination by ablation debris, and large kerf width.

In contrast, the laser filamentation regime offers a new direction for internal laser processing of transparent materials that can avoid ablation or surface damage, dramatically reduce kerf width, avoid crack generation, and speed processing times for such scribing applications. Further, high repetition rate lasers define a new direction to enhance the formation of laser beam filaments with heat accumulation and other transient responses of the material on time scales that are faster than thermal diffusion out of the focal volume.

The various embodiments presented herein harness short duration laser pulses (e.g., <100 ps) to generate a submicron localized damage zone inside a transparent material or medium. The ultrafast laser avoids dense plasma generation such as optical breakdown at the top surface of the transparent medium target that can be easily produced in tight optical focusing conditions as typically applied and used in femtosecond laser machining. If an optical breakdown regime is used combined with ultrafast MHz-GHz laser pulses and the laser focus is adjusted at the exit surface of the target material, ablation debris and cracks are avoided when singulating the material.

The process is adjusted by first combining ultrafast MHz-GHz laser pulses that are focused to create optical breakdown in the air in the absence of any target. The location of the optical breakdown is adjusted to overlap at the exit surface of the target. A nonlinear Kerr effect takes place as soon as the ultrafast laser beam enters to the target top surface. A self-focusing mechanism of the laser focuses the beam naturally to focus below an approximately 200 nm covering from the top to the bottom of the target. The nonlinear Kerr effect creates an extended laser interaction focal volume that greatly exceeds the conventional depth of focus, overcoming the optical diffraction that normally diverges the beam from the small self-focused beam waist.

In one non-limiting manifestation at such a high repetition rate, there is insufficient time (e.g., 10 to 200 ns) between laser pulses for thermal diffusion to remove the absorbed laser energy, and heat thereby accumulates locally with each laser pulse. In this way, the temperature in the interaction volume rises during subsequent laser pulses, leading to laser interactions with more efficient heating and less thermal cycling. In this domain, brittle materials become more ductile to mitigate crack formation and smooth melting occurs locally in an elongated void zone.

In some embodiments, a burst of ultrafast pulses with approximately a 400 picosecond spacing (2.5 GHz) is used. Using GHz burst ultrafast pulses to interact with transparent material such as glass introduces an extreme speed of incoming pulses and multiphoton ionization that occurs much faster as compared to MHz bursting. Generally, multiphoton ionization of electrons in the material happens in a time scale of about 10 femtoseconds. Electron-electron interactions occur within less than 100 femtosecond. Free generated electrons interact with phonons in a time scale of 1 picosecond. Further, phonon-phonon interactions happen in an 100 picosecond time scale. Free electron lifetime is in the order of a few nanoseconds. This clearly indicates the importance of bombarding the material with 400 picosecond steps. Before free electrons generated by the first pulse in the burst annihilate the last pulse in the burst, the last pulse has already arrived in the target and created more free electrons through ionization. The ultrafast time scale of these phonon-phonon interactions generates an efficient pulse energy that will turn to very localized plasma generation resulting in nanometer scale melt formation. By moving the transparent material target under an ultrafast laser beam, different scribe paths can be created. The melt zone creates a weaken bond in the laser propagation path that can be used as internal scribing.

In another embodiment, to deposit further pulse energy inside the transparent material, a burst of pulses in the MHz range is used at approximately a 15 ns pulse to pulse spacing. Each pulse in this burst consists of about 2 to 10 pulses at about a 400 ps spacing. It is to be noted that the ultrafast laser pulses at three different repetition rates. The first and fundamental repetition rate of the laser is set at approximately 100 kHz. This dictates the scribing speed. For example, if the scribing speed is set at 250 mm/s and the repetition rate of the laser is set at 100 kHz, then at each 2.5 microns, a laser pulse will hit the target. The second repetition rate is the MHz burst rate. It is noted that commercial lasers typically have a 40 to 80 MHz seeder, that is, the pulse to pulse spacing will be in a 12.5 ns to 25 ns range. The third repetition rate is the GHz burst repetition rate. Ultrafast lasers with a regenerative amplifier can be set to generate such high frequency bursts. In some embodiments, the range is about 1 to 10 GHz, e.g., 2.5 GHz which translates to a 400 ps pulse to pulse spacing.

The system and methods described herein are applicable to any transparent medium, including glasses, crystals, ceramics, polymers, liquid-encapsulated devices, multilayer materials or devices, and assemblies of composite materials. In the present disclosure, it is further to be understood that transparency, as generally described, is not limited to the visible spectrum, but represents any material that is transparent to a laser wavelength also in the vacuum ultraviolet, ultraviolet, visible, near-infrared, or infrared spectra.

The foregoing has outlined rather broadly the more pertinent and important features of the present disclosure in order that the detailed description that follows may be better understood so that the present contribution to the art can be more fully appreciated. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims.

FIG. 1 is a schematic design of a laser scribing system, according to some embodiments. Short duration turbo burst laser pulses 1.1 are focused with lens tube 1.2, inside transparent material or plates 1.3. At an appropriate laser pulse energy, elongated focusing region 1.4 is formed. This region covers from a bottom surface of the transparent material up to top surface of the plate 1.3 that is known as an interaction zone. As an example, to scribe a 1 mm thick glass, the interaction zone has less than 200 nm width, 1 mm height along the scribe line. The property of the glass is modified in this region due to strong plasma generation, making it vulnerable to cleave. Cleavage can be done naturally for heat or chemically strengthened glass, with some glasses such as sodalime that can be cleaved by mechanical bending or heat generated by flame or CO2 laser beam.

Figure 2:
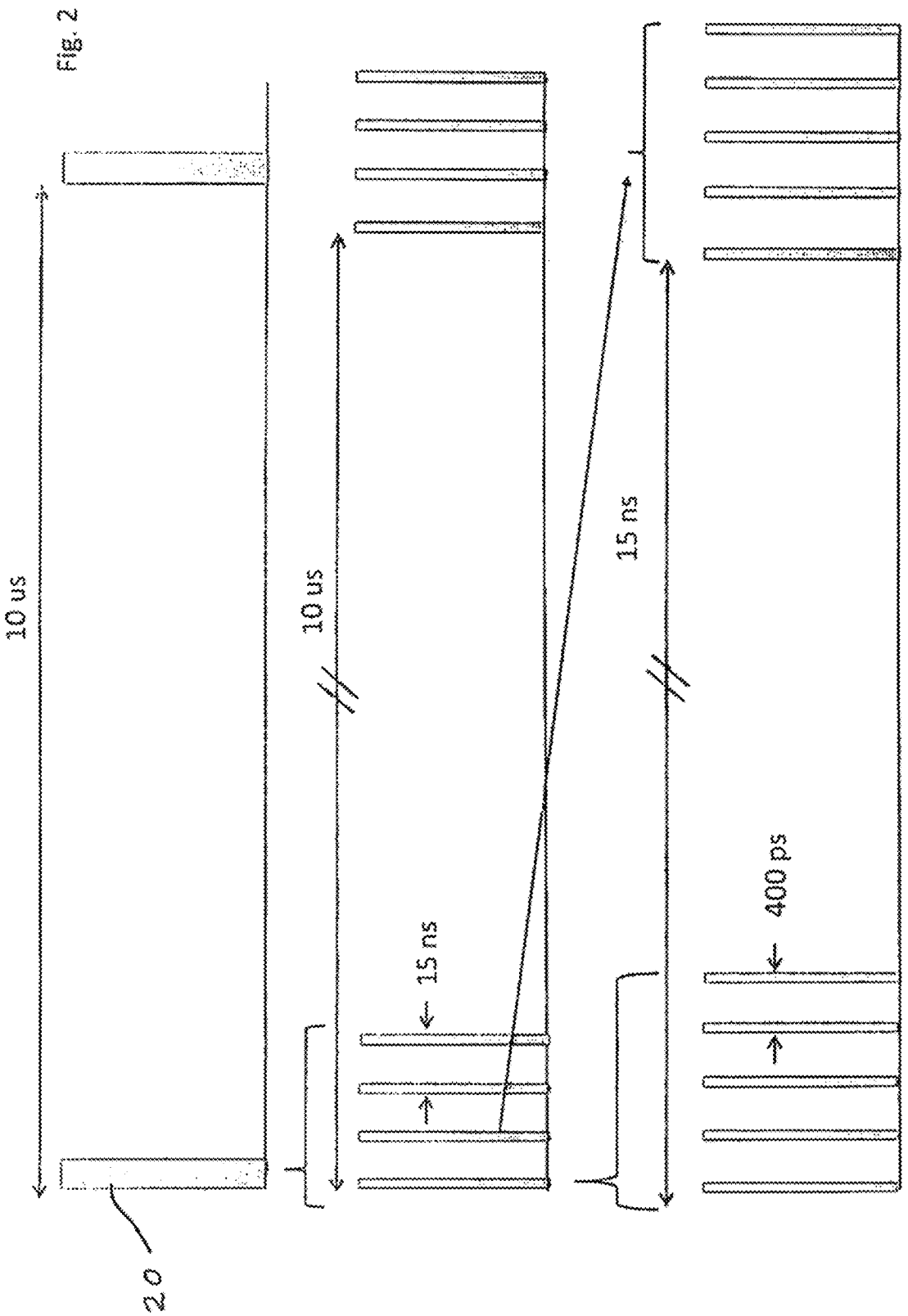
FIG. 2 is a schematic drawing of laser pulse trains with a turbo burst, according to some embodiments.

FIG. 2 is a schematic drawing of laser pulse trains with a turbo burst, according to some embodiments. The laser pulse train 20 has three different laser repetition rates. The first repetition rate is the standard laser repetition rate. This rate dictates the scribing speed. In some embodiments, an ultra-fast laser with repetition rates of 1 kHz to 100 kHz may be used. Setting the interaction steps at 2.5 micron, 1 kHz is equivalent to a scribing speed of 2.5 mm/sec and 100 kHz is equivalent to a 250 mm/sec scribing speed. A scribing speed of 250 mm/sec is particularly useful for line scribing or overall bigger size scribing, while a slower speed is more suitable for smaller shape scribing. The laser repetition rate can be generally set at 100 kHz. A motion stages encoder integrated with the laser generates a gate signal to pick the pulses. As an example, if the scribing speed is set at 100 mm/sec, then a gate signal picks one laser pulse and ignores the next laser pulse. To make a spline shape such as a smart glass lens, motion at the corners slows down, the encoder reads the location, and generates the laser fire signal known as Position Synchronized Output or PSO signal. In this way, pulses don't overlap at the corners, but stay at the same set distance. In the above example, if the speed reduces to 50 mm/sec at the corner, then automatically one laser pulse is picked up and the next four pulses are ignored.

The secondary repetition rate is the laser seeder rate. This varies generally from 30 MHz to 80 MHz depending on the laser manufacturer. As shown in FIG. 2 as an example, this repetition rate can be set at 60 MHz with three pulses in the burst with a 15 ns pulse to pulse spacing. Recently, some lasers can be set to work in a third repetition rate mode, making GHz bursting possible within regenerative amplifiers. As shown in FIG. 2, four pulses are set at a 400 picosecond spacing (2.5 GHz) for a burst of ultrafast pulses. Using GHz burst ultrafast pulses to interact with transparent material such as glass introduces an extreme speed of incoming pulses and multiphoton ionization that occurs much faster as compared to MHz bursting.

Different laser burst pulse configurations may be tested where only MHz bursts are used, followed by GHz burst pulses with each test done with a single and up to 10 pulses in each burst. A combination of both MHz and GHz pulses can also be used to improve the scribing results. The MHz-GHz burst combination is generally referred to herein as Turbo Burst pulses.

The present method of a turbo burst repetition rate with a secondary repetition rate of 60 MHz and a third repetition rate of 2.5 GHz at a laser frequency of 100 kHz is effective in glass for pulse durations tested in the range of 250 fs to 10 ps. The 250 fs pulses are transform limited but by varying the compressor grating at the output of the laser it is possible to chirp the pulses to longer pulse durations. Even without loss of generality, chirped pulses are also suitable for scribing similarly to a transform limited pulse. The present disclosure requires an appropriately high intensity to drive Kerr-lens self focusing in most transparent media causing plasma generation in transparent materials. Therefore, laser pulse durations in the range of 50 femtosecond to 25 ps are considered to be the practical operating domain of the present disclosure. Other laser pulse durations can also be used without deviating from the scope of the present disclosure.

Based on the pulse train of the example of FIG. 2, if the laser has 40 W of average power and is set at 100 kHz first repetition rate, each pulse has 400 µJ. When a turbo burst is used with a 4 burst pulse in the secondary repetition rate and 5 burst pulses in the third repetition rate, the pulses energy is distributed as follows: 400 µJ divided by 4 that results in 100 µJ per each MHz burst and 100 divided to 5 results in 20 µJ per pulse. It can be assumed that all the pulses have substantially equivalent per pulse energy. The pulses can be shaped as ramp up or ramp down burst shapes. With a 200 femtosecond pulse duration, the pulse peak power can be calculated as 20 µJ/200 fs=100 MW sufficient to make a plasma interaction zone in a Kerr medium such as glass.

Figure 3:
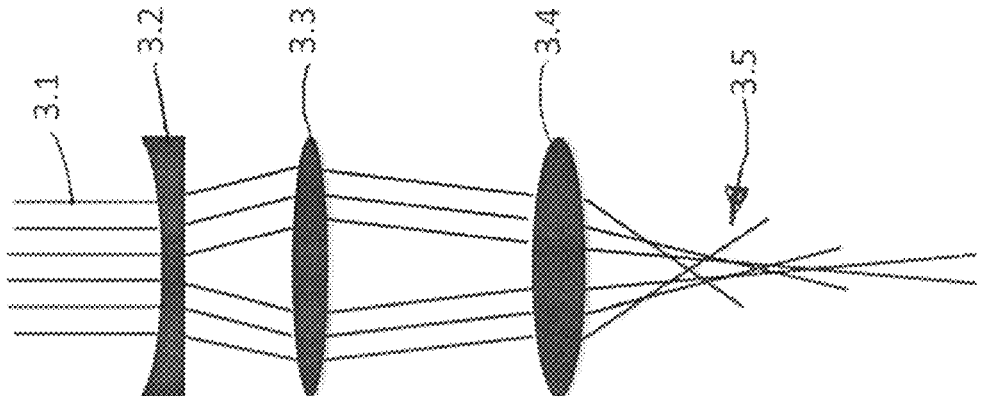
FIG. 3 illustrates a method for creating focus based on optical breakdown, according to some embodiments.

FIG. 3 presents a schematic view of focusing optics to tightly focus the laser beam to cause optical breakdown in the air in the absence of any target. The location of optical breakdown is adjusted to overlap at the exit surface of the target. A nonlinear Kerr effect takes place as soon as the laser beam enters the target. A self-focusing mechanism focuses the beam naturally to below 200 nm covering from top to bottom of the target.

It should be noted that the lens combination to enhance the spherical aberration is also just an example. Different combinations with fewer or more lenses can be utilized to induce spherical aberration in the beam. While the central rays focus deep in the material, the surrounding rays focus closer to the lens. The lens combination induces spherical aberration in the beam resulting in a long depth of focus.

Figure 4:
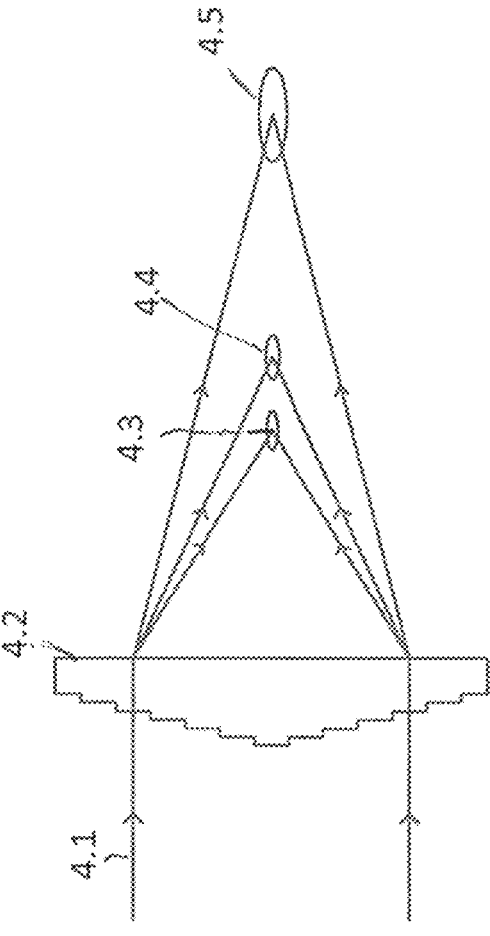
FIG. 4 illustrates a method for creating focus using a diffraction optical element, according to some embodiments.

In another embodiment of the current disclosure as shown in FIG. 4, the laser beam 4.1 is focused using diffractive optical elements (DOE) 4.2 to create multiple focal points of 4.3 to 4.5 at approximately the same time. The number and location of focuses are designed to create multiple focusing along the focus line. Without loss of generality, the laser beam can be Gaussian or a flat top shaped beam before entering the DOE.

Figure 5:
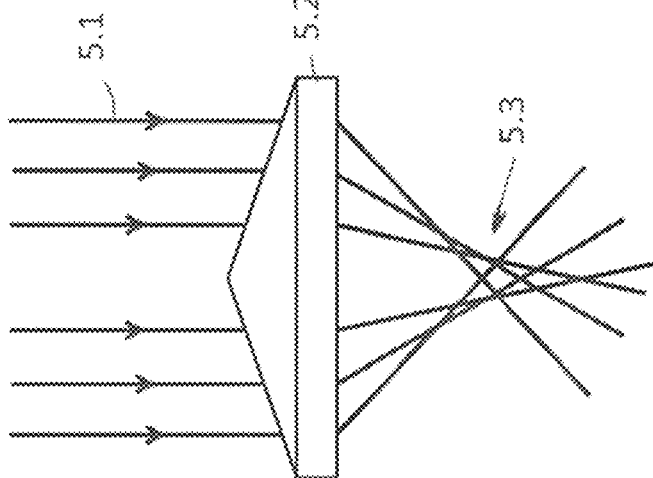
FIG. 5 illustrates a method for creating focus using an axicon element, according to some embodiments.

FIG. 5 presents another scheme for focusing. Laser beam 5.1 is focused using an axicon 5.2. Axicon 5.2 creates a Bessel beam. This also will have a long depth of focus 5.3.

In general, in all three methods for focusing described above, the laser spot size is about 100 to 200 micron on the target surface. The depth of focus can extend to a few mm when laser pulses with peak power of less than a critical power is used. Using such beam will not cause any non-linear effects and the beam will focus based on linear optics laws. It is challenging to focus the beam to 1 micron while having few mm depth of focus using such optics. To focus a beam having a 1 micron wavelength to a 1 micron spot size, an objective lens with an NA of 1 may be used. Such objective (i.e. 100× objective) lens will have a depth of focus with a few microns. It is appreciated that the still beam can be tightly focused, but at the exit surface of the target the non-linear effects modify the focus to be very narrow, e.g., around 200 nm in width and as long as 2 mm in length. If a longer depth of focus is needed, then one option is to use a very low NA lens (e.g., 0.2 to 0.4 NA), but at bigger spot size.

It is noted that self-focusing starts when the laser pulse power exceeds the critical power. As soon as the peak power exceeds the critical power, the pulse that had a 200 micron spot size shrinks to a 1 micron spot size.

The propagation of ultrafast laser pulses (e.g., >~5 MW peak power) in transparent optical media is complicated by the strong reshaping of the spatial and temporal profile of the laser pulse through a combined action of linear and nonlinear effects such as group-velocity dispersion (GVD), linear diffraction, self-phase modulation (SPM), self-focusing, multiphoton/tunnel ionization (MPL/TI) of electrons from the valence band to the conduction band, plasma defocusing, and self-steepening.

Under any focusing conditions of FIG. 3 to FIG. 5 when the beam focuses in the Kerr material such as glass, the center of the pulse that has a much higher intensity than its surroundings translates into a bigger refractive index, thereby slowing the pulse center and speeding its surroundings that results in collapsing the pulse. This phenomena is known as nonlinear self-focusing. In the focusing region due to a very high peak intensity multiphoton ionization, field ionization, and electron impact ionization of the medium sets in to create low-density plasma in the high intensity portion of the laser beam. A total time to deposit all the GHz burst pulses energy to the material using the burst configuration of FIG. 2 is about 3×400 ps=1.2 ns. Free generated electrons have few ns lifetime and plasma shielding, while no laser pulse is irradiated during this time. For this physical reason, the pulse energy avoids plasma shielding. As compared to using a MHz burst, since the number of pulses in the MHz burst increases, the late arrived pulses will feel the plasma shielding effect. This plasma temporarily lowers the refractive index in the center of the beam path causing the beam to defocus and break up the plasma channel (filament). This effect is not observed using GHz bursting and plasma channels are very smooth and uniform.

Now in the time scale of phonon-phonon interaction while the first GHz burst pulse heated the material, a second set of GHz burst pulses arrive to the target (e.g., after about 15 ns), thereby creating new ionizations and plasma channel formation. Based on the example of pulse trains of FIG. 2, the same location may be bombarded 5 times and each time by 4 GHz pulses. Instead of focusing a 400 μJ single pulse to the target that results in surface ablation and micro-cracks formation inside the brittle material, the pulse may be divided into 20 sub pulses arranged in a well ordered time scale. If all the pulses are designed to be deposited in a GHz time scale, only up to 8 pulses may be needed to do an effective filamentation and the rest could be blocked by plasma shielding that is generated by early pulses.

If only MHz burst pulses are deposited (i.e. 4 pulses in the burst), then each time 100 μJ is irradiated to the material assuming a 40 W of average power. This still makes nice filaments, but due to high peak power the glass surface roughness stays at about 1 micron. With the turbo burst pulses of the present disclosure, the surface roughness drops to 120 nm. This results in a much smother cut facet quality.

Figure 6:
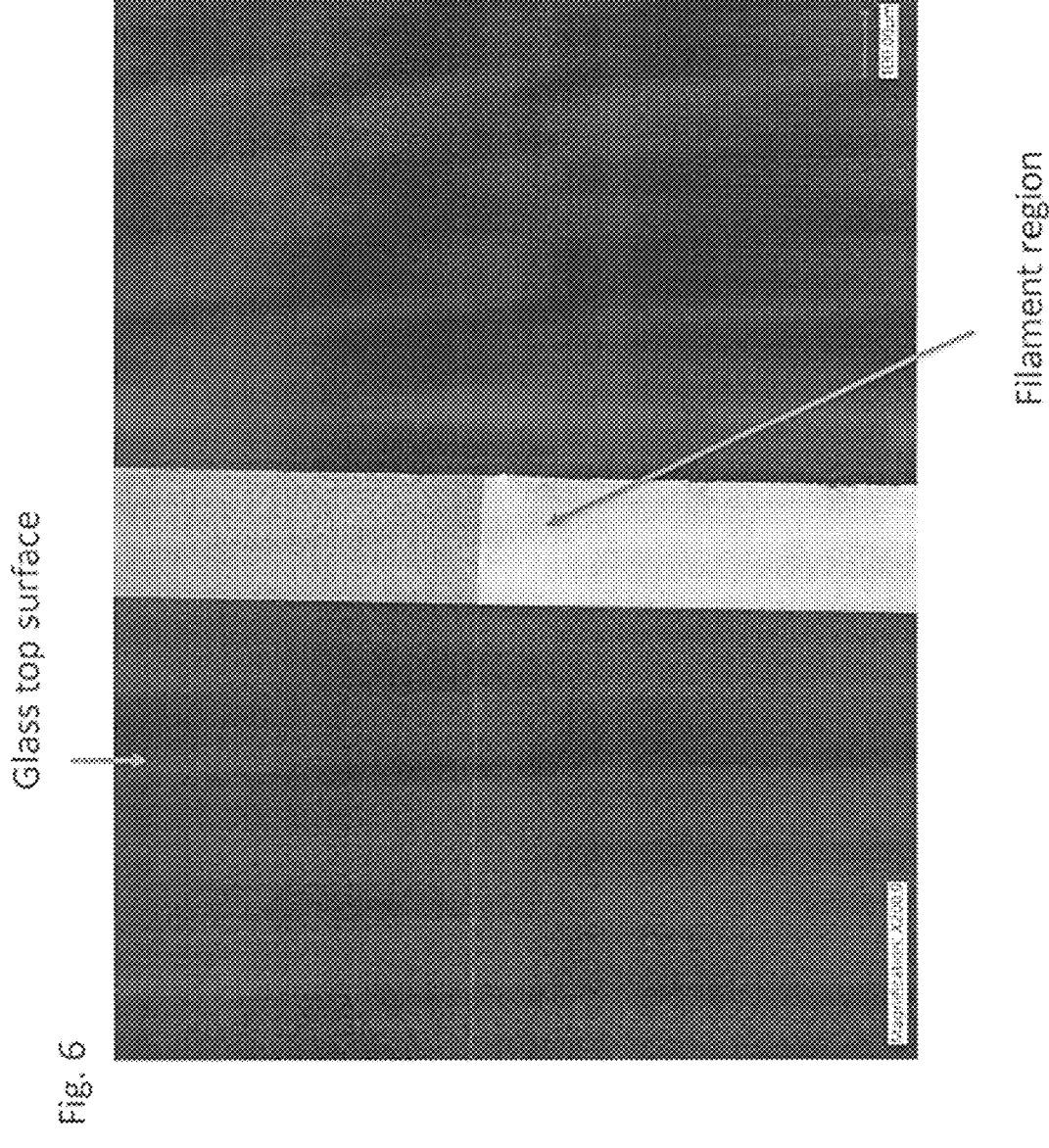
FIG. 6 is a schematic diagram showing a top surface and edge view of a glass material after scribing using turbo burst ultrafast pulses before cleavage, according to some embodiments.

FIG. 6 is an angle view of the scribed line in 1 mm glass. It shows the surface scribe line and side facet view. Sample cleaves by minor mechanical force.

Figure 7:
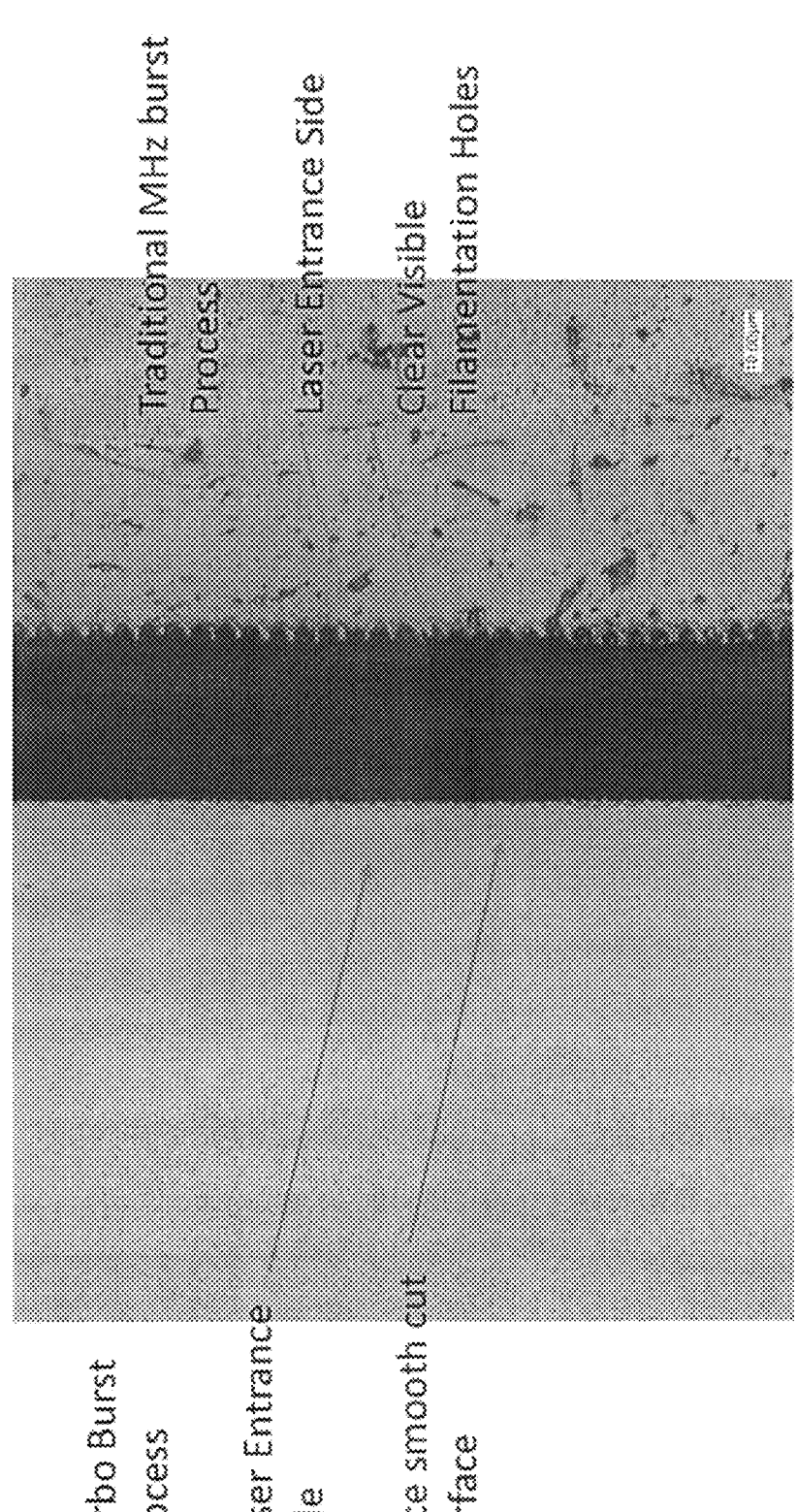
FIG. 7 is a schematic facet view of a glass material after scribing and cleavage, according to some embodiments.

FIG. 7 compares the top surface edge roughness when traditional MHz burst ultrafast pulse filamentation (Right hand side image) or a Turbo burst ultrafast pulse (left hand side image) is used. It is very clear that the edge of the sample using traditional filamentation is rough compared to the turbo burst process. The difference between peak and valley reaches to few microns but less than 5 microns. While using a turbo burst the edge roughness drops to below 300 nm.

Due to higher peak power of MHz burst (compare to turbo burst) at the entrance of the laser where filaments start to form, the surface of the glass may get a very minor ablation effect. By examining the edges under microscope, a denting effect at the edges of the samples is observable as shown in the right hand image. It is noted that this denting effect is not observed when the turbo bursts of the present disclosure are used (left hand image).

Figure 8:
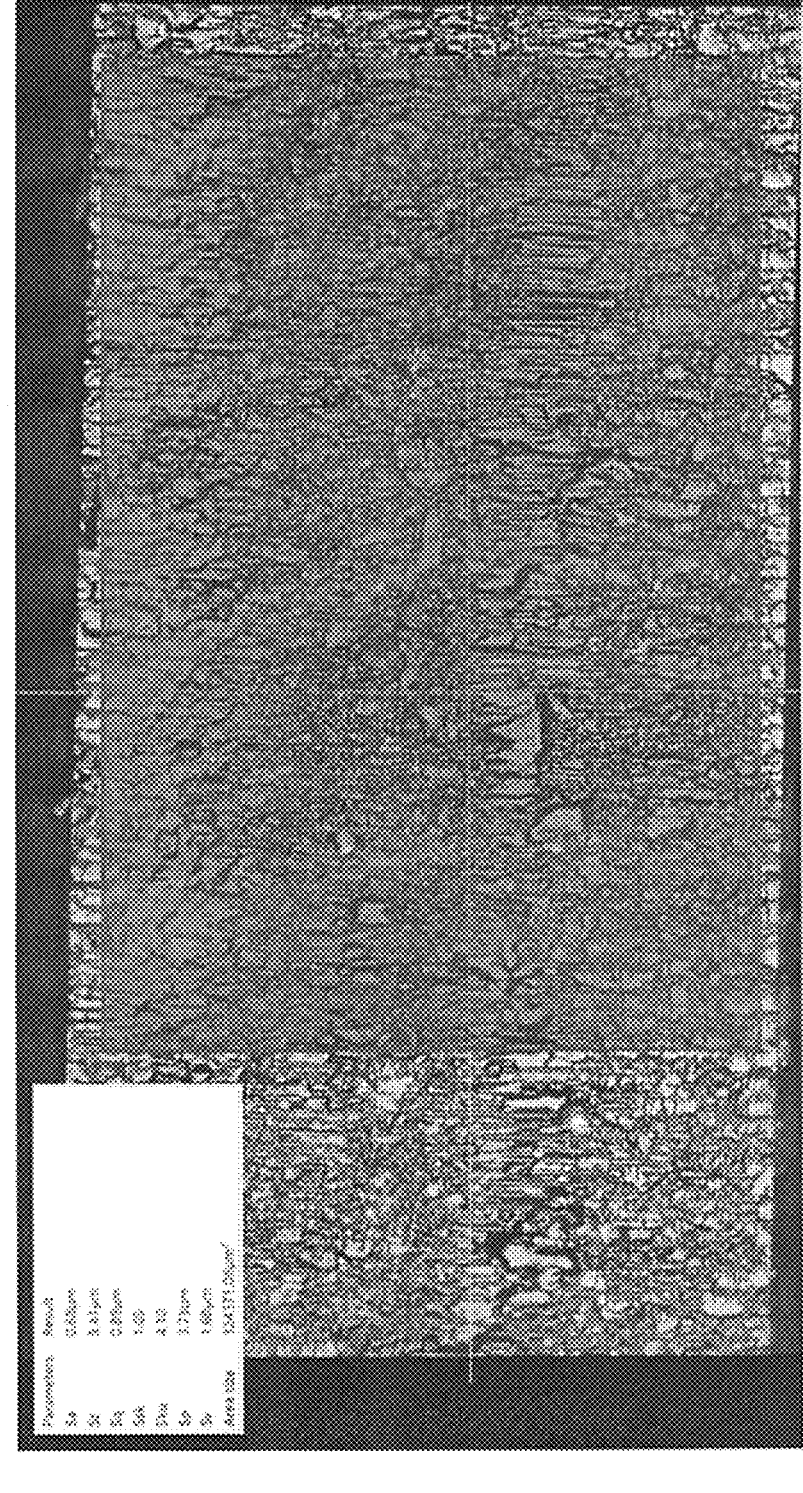
FIG. 8 is a schematic facet view of a roughness measurement after scribing using traditional burst ultrafast pulses, according to some embodiments.

FIG. 8 presents the surface Sa measurement of the facet of the cleaved sample using traditional MHz burst filamentation. It shows an Sa of 680 nm in average.

Figure 9:
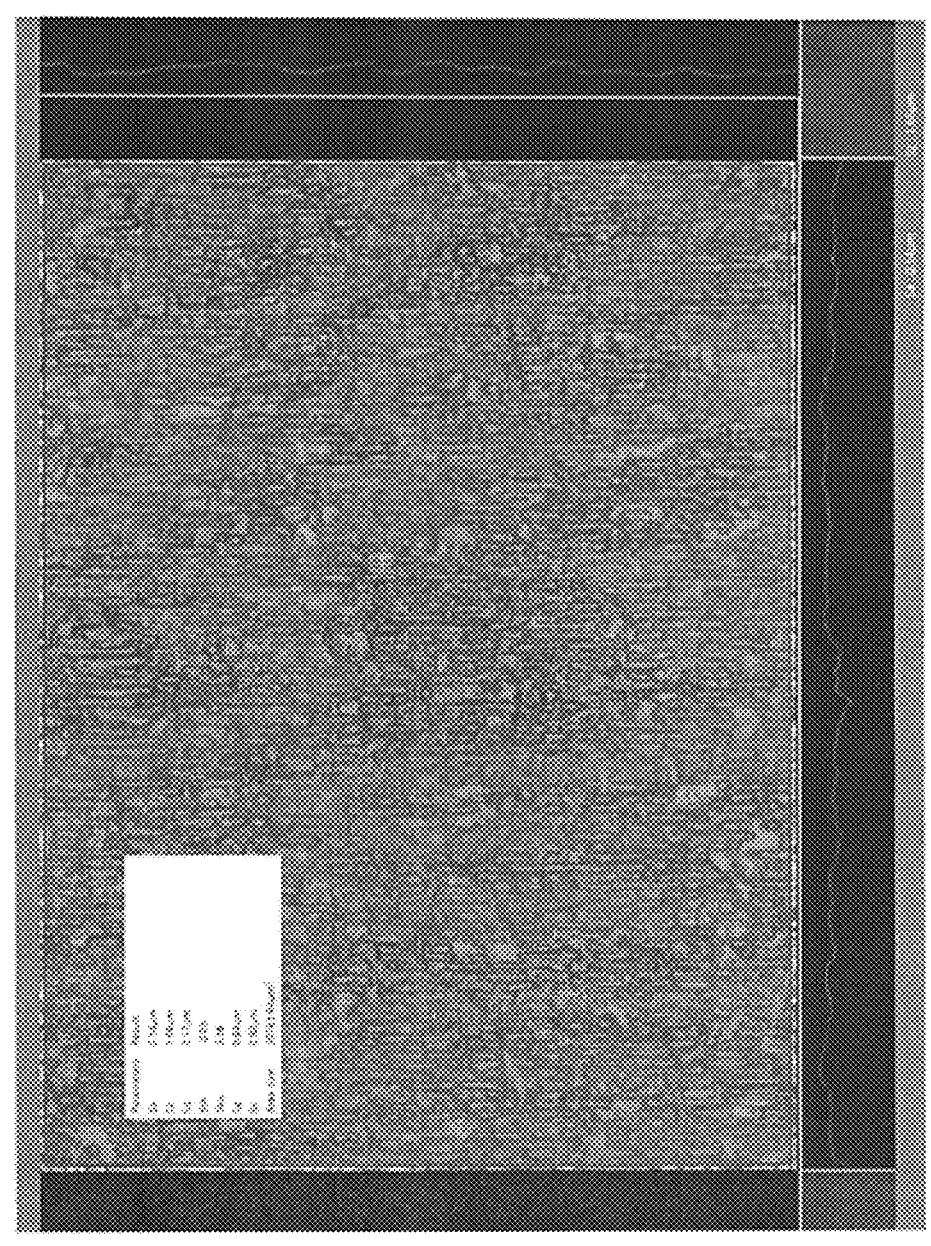
FIG. 9 is a schematic facet view of a roughness measurement after scribing using turbo burst ultrafast pulses, according to some embodiments.

FIG. 9 shows the facet of cleaved sample scribed by turbo burst pulses. After doing a measurement of surface Sa roughness under a Keyence digital microscope, it is clear that amazing improvements are obtained as compared to traditional filamentation with 140 nm surface roughness. The system and methods provided herein therefore enable scribing of transparent materials with turbo pulses that result in significantly less surface roughness and a much smother cut facet quality. In some high quality glass such as fused silica or Quartz, turbo bursts achieve about 80 nm Sa. This means an enhancement in the 4 bending strength numbers by at least 25% to 50%.

As described herein above, the present disclosure applies a mixture of GHz and MHz ultrafast laser pulses (turbo bursts) focused at the exit surface of inside the Kerr material. As such, the pulses generate a plasma modified region (filament) via nonlinear effects defined as Turbo Burst process filament. The modification dynamics of the focal volume is dramatically enhanced through a combination of transient effects involving one or more of heat accumulation, temporary and permanent nano-melts, color centers, stresses, and material defects that accumulate during the train of pulses to modify the sequential pulse-to-pulse interactions. Laser scribing formed by such turbo burst trains offer significant advantages in lowering the energy threshold for modified zone formation, increasing the zone depth while reducing this zone width. This phenomena results in almost zero kerf width, no debris and much higher bending strength numbers. Turbo filamentation burst laser process enhances the cleaved samples edge and facet roughness quality compared with the use of standard filamentation process.

While the foregoing is directed to embodiments of the present disclosure, other and further embodiments of the disclosure may be devised without departing from the basic scope thereof, and the scope thereof is determined by the claims that follow.

What is claimed is:

1. A method for scribing transparent material with a laser, comprising:

providing relative movement between the laser and the transparent material, the transparent material having a top surface and a bottom surface;

pulsing the laser at a first pulse repetition rate in a kHz range from 1 KHz to less than 1000 kHz to form a plurality of first laser pulses and to establish a speed of scribing of the transparent material, wherein each of the first laser pulses is comprised of a series of second laser pulses having a second pulse repetition rate in a MHz range from 1 MHz to less than 1000 M MHz, and wherein each of the second lasers pulses is comprised of a series of third laser pulses having a third pulse repetition rate in a GHz range from 1 GHz to less than 1000 GHZ;

directing the first laser pulses into the top surface of the transparent material; and focusing the first laser pulses to induce optical breakdown of the transparent material in a region within the transparent material that overlaps the bottom surface.

2. The method of claim 1, wherein pulsing the laser further comprises pulsing the laser through a lens combination to cause optical breakdown in air, in the absence of the transparent material.

3. The method of claim 1, wherein pulsing the laser further comprises pulsing the laser through a lens combination to induce spherical aberration in a laser beam resulting in an elongated depth of focus within the transparent material.

4. The method of claim 1, wherein pulsing the laser further comprises pulsing the laser through a diffractive optical combination to produce an elongated depth of focus within the transparent material.

5. The method of claim 1, wherein pulsing the laser further comprises pulsing the laser through an axicon optical element to produce an elongated depth of focus within the transparent material.

6. The method of claim 1, wherein the first pulse repetition rate is in a range of from 1 kHz to 100 kHz.

7. The method of claim 1, wherein the second pulse repetition rate is in a range of from 30 MHz to 80 MHz.

8. The method of claim 1, wherein pulsing the laser further comprises;

applying a first pulse spacing between each of the second lasers pulses, and applying a second pulse spacing between each of the third laser pulses, wherein the second pulse spacing is less than the first pulse spacing.

9. The method of claim 8, wherein the second pulse spacing is in a range of from 250 femtoseconds to about 10 picoseconds.

10. The method of claim 1, wherein the third pulse repetition rate is in a range of from 1 GHz-to 10 GHz.

11. The method of claim 1, further comprising pulsing the series of third laser pulses at a pulse rate that is in a range of from about 250 femtoseconds to about 10 picoseconds.

12. A method for scribing a transparent material with a laser, the method comprising:

providing relative movement between a laser and the transparent material, wherein the transparent material has a top surface and a bottom surface;

pulsing the laser to form a plurality of pulse bursts, wherein each pulse burst comprises a plurality of laser pulses having a pulse repetition rate in a range of from 1 GHz to less than 1000 GHz with a pulse spacing therebetween that is less than 1 nanosecond;

directing the laser into the top surface of the transparent material; and focusing the laser pulses to induce optical breakdown of the transparent material in a region within the transparent material that overlaps the bottom surface, wherein each pulse burst is configured to annihilate a prior pulse burst in the transparent material and create free electrons through ionization.

13. The method of claim 12, wherein pulsing the laser further comprises pulsing the laser through a lens combination to cause optical breakdown in air, in the absence of the transparent material.

14. The method of claim 13, wherein focusing the laser further comprises pulsing the laser through a lens combination to induce spherical aberration in a laser beam resulting in an elongated depth of focus within the transparent material.

15. The method of claim 13, wherein pulsing the laser further comprises pulsing the laser through a diffractive optical combination to produce an elongated depth of focus within the transparent material.

16. The method of claim 13, wherein pulsing the laser further comprises pulsing the laser through an axicon optical element to produce an elongated depth of focus within the transparent material.

17. The method of claim 13, wherein the pulse spacing is in a range of from 250 femtoseconds to about 10 picoseconds.

18. The method of claim 13, wherein the pulse repetition rate is in a range of from 1 GHz to 10 GHz.

\* \* \* \* \*